(12) United States Patent
Kataoka

(10) Patent No.: US 6,715,616 B2
(45) Date of Patent: Apr. 6, 2004

(54) FILTER DEVICE FOR COFFEE OR THE LIKE

(75) Inventor: George Kataoka, Tokyo (JP)

(73) Assignee: Kataoka Bussan Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/021,847

(22) Filed: Dec. 13, 2001

(65) Prior Publication Data

US 2002/0148772 A1 Oct. 17, 2002

(30) Foreign Application Priority Data

Apr. 16, 2001 (JP) ........................................ 2001-116990

(51) Int. Cl.$^7$ ................................................. A47J 31/06
(52) U.S. Cl. ........................ 210/474; 210/473; 210/476; 426/77; 426/82; 426/111
(58) Field of Search .................................. 210/473, 474, 210/493.5, 502.1, 503, 497.3, 282, 475, 476, 481; 426/77–82, 111; 99/290, 295, 319, 322; A23F 3/00; A47J 31/00, 31/06, 31/08; B65B 29/02

(56) References Cited

U.S. PATENT DOCUMENTS

| | | | | |
|---|---|---|---|---|
| 3,434,589 A | * | 3/1969 | Valtri et al. | 206/218 |
| 4,306,492 A | * | 12/1981 | Zimmermann | 99/287 |
| 4,520,716 A | * | 6/1985 | Hayes | 99/306 |
| 4,777,137 A | * | 10/1988 | Lemonnier | 435/288.1 |
| 4,867,993 A | * | 9/1989 | Nordskog | 426/77 |
| 5,733,448 A | * | 3/1998 | Kaura | 210/238 |
| 5,806,408 A | | 9/1998 | DeBacker et al. | |
| 6,103,116 A | * | 8/2000 | Koslow et al. | 210/282 |

FOREIGN PATENT DOCUMENTS

| EP | 0326685 A | 8/1989 |
|---|---|---|
| FR | 1259606 A | 4/1961 |
| JP | 5-10766 | 3/1993 |
| JP | 5-40843 | 10/1993 |

* cited by examiner

Primary Examiner—Joseph Drodge
Assistant Examiner—Krishnan S Menon
(74) Attorney, Agent, or Firm—Butzel Long

(57) ABSTRACT

A filter device for coffee or the like which includes an open frame 2 formed of sheet material having predetermined rigidity, such as thick paper, and which is smaller in diameter than a blind-end frame 3. Both the frames are connected by a tubular body part 5 formed of deformable sheet material provided with shape retaining ability having predetermined rigidity and flexibility such as thin paper, non-woven fabric, etc. to compose a cup-like container body 1 having a wider bottom in a shape of substantially truncated cone. The filter device can be placed on a coffee cup for use. When the filter device is not in use, the open frame 2 is folded and pushed into the blind-end frame 3 by means of flexibility of the body part 5 and contracted. For use, the open frame 2 is pulled up to expand the body part 5, and the container body is restored into the cup-like shape and prepared to be poured with hot water.

10 Claims, 3 Drawing Sheets

FILTER DEVICE FOR COFFEE OR THE LIKE

BACKGROUND OF THE INVENTION

1. Field of the Invention

The present invention relates to a handy filter device of dripping type for extracting drinks such as coffee, tea, etc.

2. Description of the Related Art

Recently, there has been a widespread use of filter devices for coffee of dripping type in which hot water is directly poured on ground coffee to extract coffee liquid, and a lot of the filter devices of this type have been proposed, put into practice, and placed on market.

In most of the handy filter devices of disposable type for one person or a few people, ground coffee is integrally enclosed in the device in advance, and coffee liquid can be extracted simply by pouring hot water. Moreover, because the filter device of the type can be disposed of, after use, as a trash, it has been widely and conveniently used.

The filter device of this disposable type can be largely classified into two types. One is a filter device for coffee of a store room supporting type consisting of a store room for storing ground coffee, and a support for supporting and fixing the store room at an edge of a coffee cup or the like, and in which coffee liquid is recovered after hot water has been directly poured on the ground coffee stored in the store room, and in which the store room storing the ground coffee is dipped in the hot water reserved in the coffee cup. Further, as the other type, there is a filter device of a container type including a cup-like container for reserving hot water, and the store room for storing the ground coffee which is integrally assembled to the container. The hot water which has been once reserved in the container is allowed to pass through the store room to extract the coffee liquid.

The present invention relates to an improvement of the latter container type of these two types of the filter devices.

This filter device of the container type has been originally intended to be simple and handy, because it is aimed to be disposable. Accordingly, there has been a tendency that light material is selected. When such a filter device made of the light material is placed on a cup and hot water is directly poured, the filter device may become extremely unstable due to weight and pressure of the hot water flowing down, and sometimes, may fall from the cup if roughly treated.

Under the above circumstances, careful attention must be paid when pouring the hot water, and such a filter device as can be placed on a cup in the most stable manner has been required.

The filter device of this container type, when compared with the aforesaid filter device of the store room supporting type, has had such disadvantages that its body part formed in a cup-like shape for reserving the hot water is bulky, and production cost is relatively high in spite of disposable type. There has been another drawback that it is difficult to dispose of the filter device because of its material.

It has been a serious problem inter alia that the filter device of this type requires a larger space for stocking, transporting or displaying in shops, as compared with the filter device of the store room supporting type which can be folded into a compact state.

In order to solve the above described problems, there have been already proposed such coffee extractors as disclosed in Japanese Utility Model Publications Nos. 5-10766 and 5-40843.

In the former coffee extractor, a container body is provided with vertical pleats at a peripheral face of its lower half part, a folding line formed at an upper edge of the vertical pleats, and horizontal pleats in a radial direction at a stepped part which continuously forms a store room for storing ground coffee, thereby enabling the peripheral face of the lower half part of the container body to be folded by means of these vertical and horizontal pleats, and the folding line. In this manner, the container body can be folded into a half thus to house the store room inside the container body.

In the latter coffee extractor, a container body is also provided with vertical pleats at a peripheral face of its lower half part, a folding line formed at an upper edge of the vertical pleats, and an annular groove formed at an outer circumferential edge of a stepped part which continuously forms a store room. The container body will be folded at the folding line and the annular groove while being reduced in diameter by means of the vertical pleats thereby enabling the lower half part of the container body to be folded inside an upper half part. In this manner, the container body can be folded with the store room for coffee housed therein.

These two proposals aim to reduce a capacity of the coffee extractor into a half by folding the lower half of the container body having a cup-like shape into the upper half, thus making it compact, in order to solve the bulky state in the prior art. However, they have still such problems that the vertical and horizontal pleats must be formed on the peripheral face of the container body and the folding line must be formed at the upper edge of the vertical pleats in order to fold the container body. Further, in the latter proposal, the annular groove must be formed.

Formation of these vertical and horizontal pleats, the folding line, the annular groove, and so on has been inevitable means to be adopted, since synthetic resin material having rigidity has been selected in the two proposals to produce the extractors. However, there has been a further problem that because folded configurations are defined by shapes and dimensions of the pleats, the folding line and the annular groove, and positional relations therebetween, and further because the folding operation is promoted through cooperation between the vertical pleats and the horizontal pleats, between the pleats and the folding line, and between the pleats and the annular groove, the folding and expanding operation must be conducted while making a balance between the above described parts.

There has been a still further problem in the above proposals that since the material must be synthetic resin for a reason of forming the pleats and the folding line, the device cannot be simply disposed of as trash in spite of disposable type.

OBJECTS OF THE INVENTION

In view of the circumstances, the present invention has been made in order to overcome the above described drawbacks in the conventional filter device of the container type.

It is a primary object of the present invention to provide a filter device for coffee and so on, which can be freely folded and expanded having excellent handling performance, which can be manufactured of paper or the like as material, and which can be simply disposed of after use, and at the same time, can be stabilized when placed on a cup for use and can be safely used without falling from the cup when hot water is poured.

SUMMARY OF THE INVENTION

In order to attain the above described objects, there is provided according to the present invention, a filter device for coffee or the like comprising an open frame in a short tubular shape, a blind-end frame in a short tubular shape having a larger diameter than the open frame, both the frames being formed of sheet material having predetermined rigidity, a body part in a tubular shape of truncated cone formed of sheet material having predetermined rigidity and flexibility which is deformable and has shape retaining ability, the open frame and the blind-end frame being arranged above and below, and integrally connected by way of the body part thereby to compose a container body substantially in a shape of truncated cone in its outer shape, and a store room for enclosing substance to be extracted such as ground coffee or the like which is continuously provided in a bottom of the blind-end frame, wherein while not in use, the open frame is adapted to be folded and housed inside the blind-end frame together with the body part by means of flexibility of the body part thereby to contract the container body, and while in use, the body part is expanded by pulling out the open frame from the blind-end frame, whereby the container body is expanded and restored to an original cup-like shape.

According to another aspect of the invention, the container body is formed in a tapered shape having its diameter gradually enlarged from the open frame toward the blind-end frame.

According to a further aspect of the invention, a height of the open frame is equal to or smaller than a height of the blind-end frame above an upper face of a bottom of the blind-end frame which is adapted to house the open frame.

According to a still further aspect of the invention, the body part has an upper end edge connected to a lower end of the open frame and a lower end edge connected to an upper end of the blind-end frame, the upper and lower end edges being respectively extended along inner peripheral faces of the open frame and the blind-end frame, and attached to the inner peripheral faces in a face to face contact to be integral therewith.

According to a still further aspect of the invention, the body part has an upper end edge connected to a lower end of the open frame and a lower end edge connected to an upper end of the blind-end frame, the upper and lower end edges being respectively extended along outer peripheral faces of the open frame and the blind-end frame, and attached to the outer peripheral faces in a face to face contact to be integral therewith, whereby the body part covers whole outer peripheral faces of the open frame and the blind-end frame.

According to a still further aspect of the invention, the blind-end frame includes a cup holding frame having predetermined rigidity which is formed at a circumferential edge of a bottom of the blind-end frame and extended downwardly from the bottom.

According to a still further aspect of the invention, the blind-end frame is provided with a reinforcing frame which is extended downwardly from the circumferential edge of the bottom and attached to an inner face of the cup holding frame thereby to form a deep engaging space below the bottom.

According to a still further aspect of the invention, the blind-end frame is provided with a hole in a bottom, through which the store room is hung down, and a skirt extending downwardly along an open edge of the hole and surrounding an outer peripheral face of an upper part of the store room in a face to face contact thereby to hold it water-tightly.

According to a still further aspect of the invention, the open frame and the blind-end frame are formed of thick paper having predetermined rigidity, and the body part is formed of thin paper having predetermined rigidity and flexibility, which is deformable and has shape retaining ability.

According to a still further aspect of the invention, the open frame and the blind-end frame are formed of non-woven fabric having predetermined rigidity, and the body part is formed of non-woven fabric having predetermined rigidity and flexibility, which is deformable and has shape retaining ability.

In the filter device which is constructed and used as described above according to the present invention, the container body can be expanded into the cup-like shape for use, and placed on a coffee cup or the like, in the expanded state prepared to be poured with hot water, and thus can be used as a filter of dripping type. On the other hand, when it is not used or before the use, the open frame of the container body can be pushed into the blind-end frame together with the store room, contracted to be minimized, and housed in the blind-end frame. Consequently, the filter device will not be bulky, can be easily packed, and will not occupy a large space when it is stocked, transported or displayed in shops.

Further, in the filter device according to the invention, the open frame need not start to be folded or expanded at a particular position or part, but can be contracted and expanded from any part taking advantage of flexibility of the body part. Therefore, it is advantageous that the contracting and expanding operation can be simply and easily conducted without feeling resistance.

Particularly, the open frame and the blind-end frame having high rigidity initially lead the contracting and expanding operation, while the flexible body part follows the operation. Therefore, the filter device can be automatically folded by simply pushing the open frame into the blind-end frame, and can be easily expanded by pulling up the open frame.

Further, in the filter device according to the invention, the expanded container body is in the cup-like shape having a shape of truncated cone which grows larger toward its bottom, and the larger bottom can be placed on a coffee cup or the like in a stable manner. Therefore, it is advantageous that the filter device will not drop from the coffee cup in spite of its light weight, when it has received pressure and weight of hot water falling down, and can effectively avoid a risk.

Additionally, because the container body is provided with the cup holding frame and the reinforcing frame to form the deep engaging space below the bottom assuring further reliability, the filter device can be used without anxiety.

Other objects, features of the present invention will be made apparent from the following description with reference to the accompanying drawings.

DESCRIPTION OF THE PREFERRED EMBODIMENTS

Figure 1:
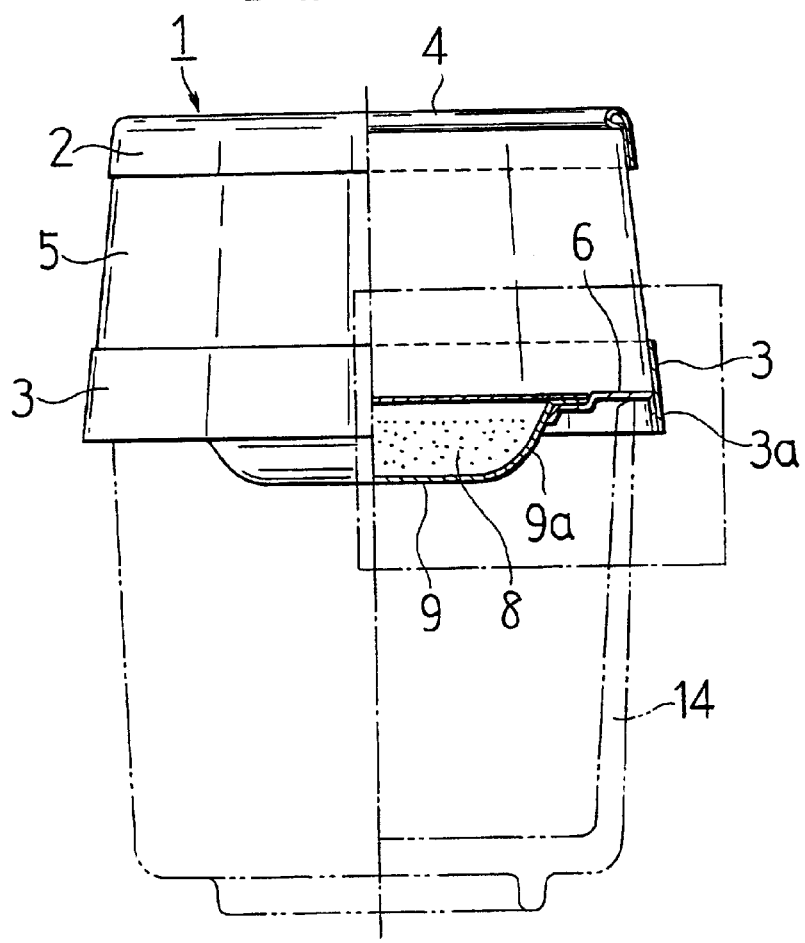
FIG. 1 is a front view of a filter device according to a first embodiment of the present invention in a state expanded for use, in which its right half part is shown in section taken along a center line.

Now, the embodiments of the present invention will be described referring to the attached drawings.

[First Embodiment]

FIGS. 1 to 4 show a filter device in the first embodiment according to the present invention. The filter device includes a container body 1 as a main body of the filter device, an open frame 2 defining an opening of the container body 1, and a blind-end frame 3 positioned below the open frame 2 and constituting a lower half part including a bottom of the container body 1.

The container body 1 is formed in a cup-like shape which has a sufficient capacity for reserving hot water corresponding to the number of persons to be served with coffee (for example, hot water in an amount enough to serve one person, in case of the filter device for one person). The open frame 2 in the upper part is formed in a short cylindrical shape having such a size as occupying an upper end portion of the cup-shaped container body 1.

The open frame 2 is given shape retaining function so as to maintain the shape of the cup-shaped container body 1 in a stable manner, especially a shape of the opening, when it is expanded for use as described below. Specifically, in this embodiment, the open frame 2 is formed of thick paper material having such rigidity as capable of retaining the cylindrical shape when the open frame 2 is grasped with a thumb and an index finger applied to its outer surface, after the hot water has been poured in the container body 1, without collapsing the cylindrical shape by the grasp.

This open frame 2 is formed in a short cylindrical shape substantially in a shape of truncated cone which is tapered with a small upper edge and a larger lower edge, so that the open frame 2 can smoothly enter into the blind-end frame 3 when it is folded into the blind-end frame 3 positioned underneath, as described below. An upper edge of the open frame 2 is folded back to form a ring-like reinforcing edge 4, thus enhancing strength of the entire structure.

On the other hand, the blind-end frame 3 is formed in a short cylindrical shape having a larger diameter than the aforesaid open frame 2, and integrally provided with a bottom 6 at a substantially middle level in height of its inner peripheral face. A circumferential edge of the bottom 6 is extended downward like a skirt to form an engaging portion 3a with respect to a cup as described below.

There is provided, in a center part of the bottom 6, a round hole 7 communicating with a store room 9 which is continuously formed below a lower face of the bottom 6 and contains the substance 8 such as ground coffee to be extracted.

Figure 2:
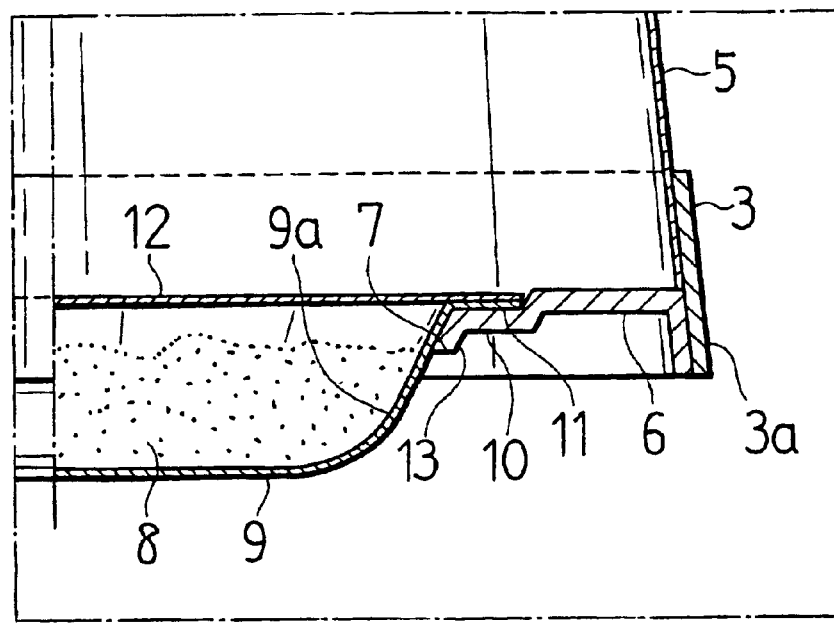
FIG. 2 is an enlarged sectional view of a part surrounded by an alternate long and short dash line in FIG. 1.

As shown enlarged in FIG. 2, the bottom 6 is stepped along a circumference of the hole 7, to form an annular receiving portion 10. A flange 11 of the store room 9 and an edge of a filter 12 covering an opening of this store room 9 are overlaid on an upper face of this receiving portion 10. This will facilitate a smooth flow of the hot water, because the upper face of the filter 12 is positioned at a lower level than the upper face of the bottom 6.

Further in this embodiment, an open edge of the receiving portion 10 is extended downward along the circumference of the hole 7 to form an annular skirt 13, a lower edge of which actually defines the hole 7. The skirt 13 surrounds an upper peripheral face of the store room 9 in a face to face contact manner, so that the hot water flowing into the store room 9 may not pass through this area unless it sufficiently contacts the ground coffee. This will prevent the extracted coffee liquid in the cup from being diluted, due to the pass of the hot water without contacting the substance 8 such as the ground coffee.

It is to be noted that the skirt 13 may be preferably extended toward the bottom of the store room as near as possible along a body area 9a of the store room 9. This is desirable especially when the store room is integrally formed of permeable filter material in a dish-like shape, and the body area, that is, its peripheral face is exposed, because the hot water is likely to pass the body area 9a.

Meanwhile, the aforesaid body part 5 is made of thin paper material which is thinner than the material of the open frame 2 and the blind-end frame 3, having flexiblity and predetermined shape retaining ability, while easily deformable so that the body part 5 can be free to be folded when the container body 1 is contracted.

The body part 5 has a height substantially equal to a sum of the heights of the open frame 2 and the blind-end frame 3. An upper edge of the body part 5 is extended along an inner peripheral face of the open frame 2 to attach an extended portion 5a to the inner peripheral face of the open frame 2, and a lower edge thereof is also extended to attach an extended portion 5b to an inner peripheral face of the blind-end frame 3 in a face to face contact, so that both the frames may be reinforced, while integrated with each other. Alternatively, the extended portions 5a and 5b can be attached to outer peripheral faces of the open frame 2 and the blind-end frame 3 respectively to improve aesthetic appearance.

The aforesaid store room 9 is formed in a dish-like shape having a smaller size than the aforesaid blind-end frame 3. The filter 12 is stretched over an upper face of the flange 11 which is projected from the edge of the body area 9a of the store room 9 in order to enclose the substance 8 to be extracted such as ground coffee or the like inside, and at the same time, in order to separate the store room from the container body 1 by means of the filter 12.

This store room 9 is formed of filter material in its entirety including the body area 9a in the dish-like shape as described above. However, it is not restricted to the dish-like shape, but may be formed in a bag-like shape or a tubular shape.

Although the store room 9 itself is required to be small, because the entire filter device should be made compact, it is also required naturally that the store room 9 has such a capacity as enclosing and holding the ground coffee or the like in an amount necessary for the number of persons to be served.

As the filter device according to the present invention is constructed as described above, in a state suitable for use, as shown in FIG. 1, the body part 5 having flexibility is expanded into a cylindrical shape to expand the entire shape of the container body 1 into a shape of substantially truncated cone. In a state after manufacture and before use, the open frame 2 of the container body 1 is folded and housed inside the blind-end frame 3 together with the body part 5 by bending the body part 5 so as to be contracted, as shown in FIGS. 3 and 4.

Contraction of the container body 1 can be performed simply by pushing down the open frame 2 taking advantage of its rigidity, and at the same time, by folding the body part 5 taking advantage of its flexibility.

In order to contract the container body 1 which has been expanded in the cup-like shape, by pushing the open frame 2 toward the blind-end frame 3, the body part 5 which has been under tension in the tubular shape will be once collapsed into an undefined shape and gradually introduced into an interior of the blind-end frame 3 while deforming, together with the open frame 2.

Figure 3:
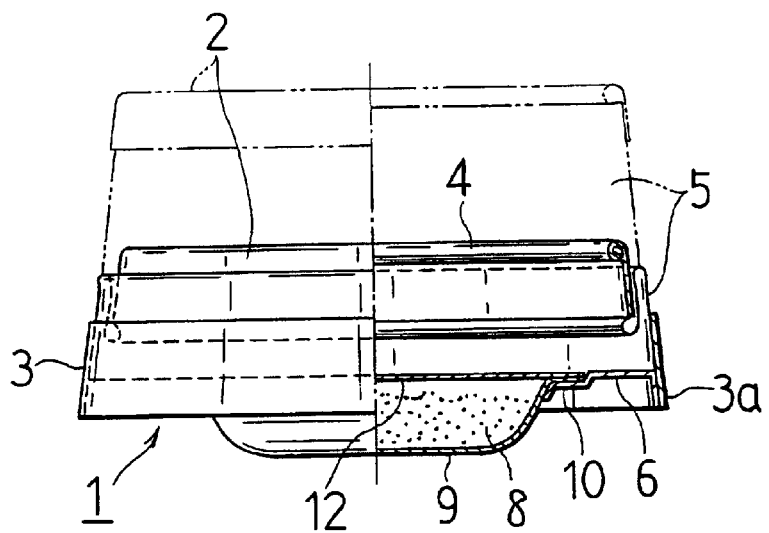
FIG. 3 is a front view of the filter device of FIG. 1 in a state where an open frame has been folded into a blind-end frame together with a body part, in which its right half part is shown in section taken along a center line.
Figure 4:
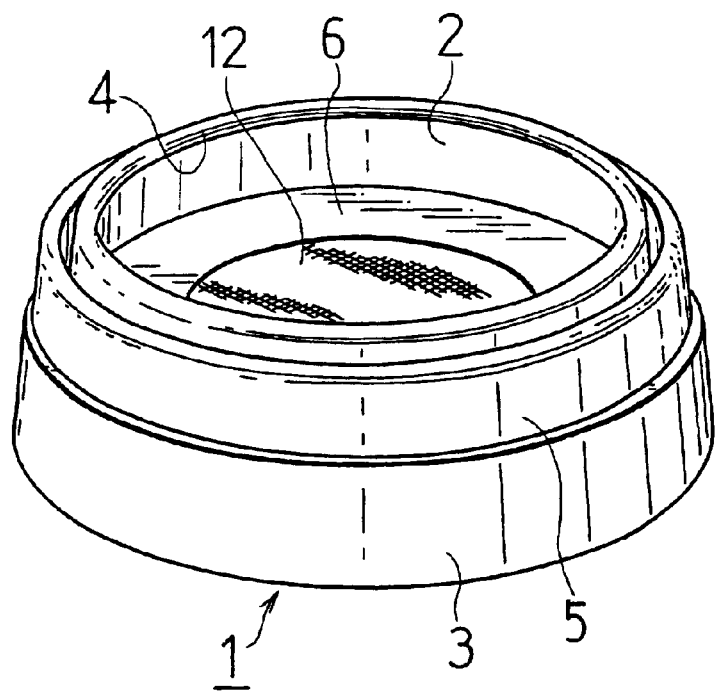
FIG. 4 is a perspective view of the filter device of FIG. 1 in a contracted state.

On this occasion, the body part 5 is folded meandering in and out, as shown in FIG. 3, and enters into the blind-end frame 3. Then, the open frame 2 which is in a cylindrical shape having a smaller size than the blind-end frame 3 will be housed inside the blind-end frame 3 and contracted.

As apparent from this contracted state, the container body 1 which has been in the cup-like shape is folded into substantially a half and reduced in height to about a half.

In this embodiment, the open frame 2 and the blind-end frame 3 are designed to have substantially the same height, and a height of the body part 5 is substantially equal to a sum of the heights of the open frame 2 and the blind-end frame 3. However, because the body part 5 has flexibility, by decreasing the heights of the open frame 2 and the blind-end frame 3, the container body 1 in the contracted state can be further downsized in the total height.

Although this downsizing may be restricted by a size of the store room 9 to be housed, the filter device can be made flat by the folding operation, thus enabling the device to be easily packed and stocked.

Although not shown, the filter device according to the present invention will be packed, stocked, transported or displayed in shops in such a collapsed and contracted state, that is, in a folded state. In this case, the filter device may be vacuum packed, according to necessity, for preventing the contents such as ground coffee or the like in the store room 9 from deteriorating, or an appropriate measure for preventing deterioration, such as filling an inert gas may be taken.

In FIG. 1, the container body 1 which has been once contracted is shown in an expanded state like a cup for use.

This expansion can be easily conducted by holding the blind-end frame 3 with one hand, and by pulling up the open frame 2 by the other hand.

As the open frame 2 ascends through the above described expanding operation, the body part 5 which has been meandering and turned back will be recovered from the turned back state in an opposite way to the occasion of folding. In this manner, the container body 1 will be restored to the original cup-like shape and come into the state for use as the filter device.

FIG. 1 shows the container body 1 placed on a coffee cup 14 and prepared for hot water to be poured. The container body 1 with the open frame 2 pulled out from the blind-end frame 3 serves to support the body part 5 between the open frame 2 and the blind-end frame 3 in a cylindrical shape by means of rigidity of both the frames, and to give tension to the entire container body 1, thus enabling the container body 1 to be held in the cup-like shape.

When the hot water has been filled in the container body 1 placed on the coffee cup 14, the hot water will penetrate into the store room 9 through the filter 12, and dampen the substance 8 such as ground coffee or the like enclosed therein. Then, coffee liquid will be recovered in the cup 14 through the bottom of the store room 9, while extracting the ingredient of the ground coffee.

On this occasion, the hot water which has passed through the filter 12 enters into the store room 9, penetrates into the ground coffee 8, and at the same time, is discharged out of an entire area of the store room. However, in some cases, while the ground coffee has not been sufficiently dampened, an upper part of the store room 9 may become vacant, and thus, the hot water may escape from the peripheral face of the upper part of the store room without contacting the ground coffee.

In this embodiment, the upper end part of the store room 9 is surrounded by the above described skirt 13 as a countermeasure, thereby to prevent the hot water from escaping. Accordingly, as the hot water always passes through the ground coffee, the thick coffee liquid can be extracted.

When the hot water has been filled, the container body 1 receives the whole weight of the hot water. At the same time, liquid pressure is exerted on the body part 5 as well as the open frame 2 and the blind-end frame 3 from inside, and put the body part 5 under tension, thus reducing the flexibility of the body part to stabilize the cup-like shape.

[Second Embodiment]

Figure 5:
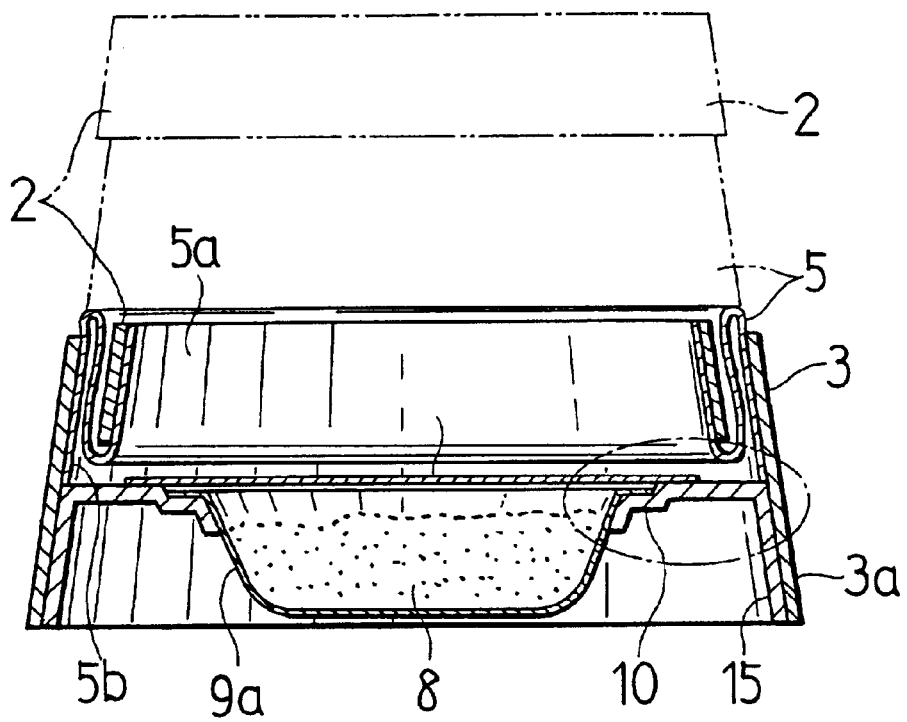
FIG. 5 is a front view of a filter device according to a second embodiment of the present invention in a folded state.
Figure 6:
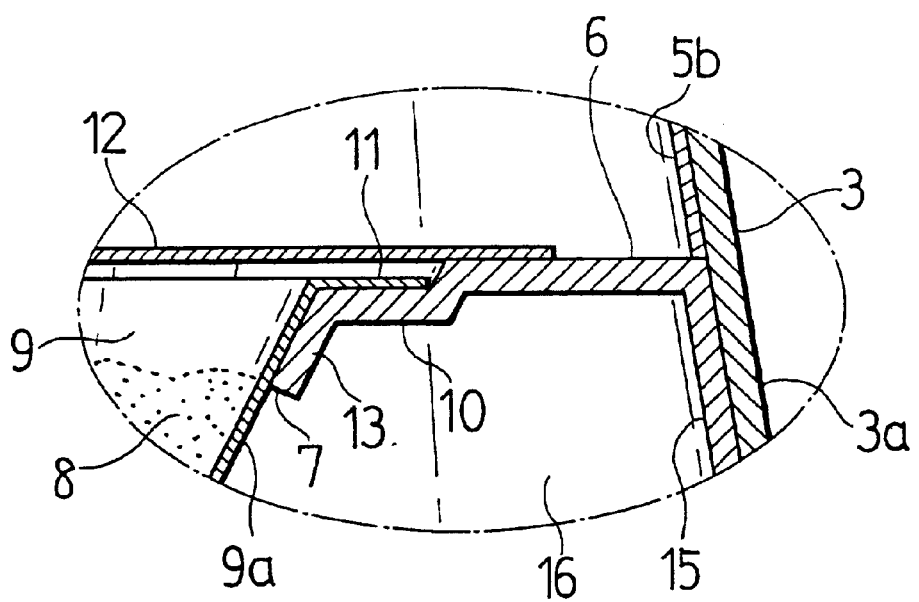
FIG. 6 is an enlarged sectional view of a part surrounded by an alternate long and short dash line in FIG. 5.

Referring to FIGS. 5 and 6, a filter device of a second embodiment according to the present invention will be described. This embodiment is another example in which on the basis of the first embodiment, strength of the blind-end frame 3 is further enhanced while maintaining contractability of the container body 1, thereby to stabilize the shape, and at the same time, to enhance stability of the filter device when placed on the cup 14.

In the description, the same parts and the same elements as in the first embodiment will be denoted with the same reference numerals, and a further explanation will be omitted.

As shown in the drawings, the structure of the blind-end frame 3 composing the container body 1 is modified in this embodiment. Specifically, the height of the blind-end frame 3 is rather larger than that of the first embodiment so that the whole open frame 2 can be housed therein, and a portion of the blind-end frame 3 below the bottom 6, that is, the engaging portion 3*a* is further extended downward so as to surround the whole store room 9 hanging down from the lower face of the bottom 6.

In this embodiment, the open frame 2 has a smaller height than the height of a portion of the blind-end frame 3 above the bottom 6. This enables the whole open frame 2 to be housed in the blind-end frame 3 together with the body part 5, when the body part 5 is folded into the contracted state.

In addition, a tubular reinforcing frame 15 is extended from a circumferential edge of the bottom 6 and attached to an inner face of the aforesaid engaging portion 3*a* to be integral with the inner face for reinforcement. Thus, a deep engaging space 16 will be created below the bottom 6.

Moreover, as shown in FIG. 6, the bottom 6 is stepped along a circumferential edge of the hole 7, to form the receiving portion 10 for receiving the flange 11 of the store room 9. Further, the skirt 13 is extended from the open edge of the receiving portion 10 to surround the upper peripheral face of the store room 9 so that the hot water may not leak out from this area. The filter 12 is directly attached to the upper face of the bottom 6 to cover the store room 9.

In the filter device according to the present invention which has been constructed as described above, the container body 1 can be expanded again into the cup-like shape by pulling out the store room 9 in the same manner as in the first embodiment. At the same time, the cylindrical shape of the body part 5 can be maintained by the rigidity of the open frame 2 and the blind-end frame 3, and the shape can be stabilized.

In this embodiment, a lower edge of the reinforcing frame 15 provided on the engaging portion 3*a* at the lower end of the blind-end frame 3 is extended downward to create the deep engaging space 16. Consequently, when the filter device is mounted on the coffee cup 14, the filter device can be reliably engaged with an open edge of the coffee cup 14 to hold it, and the filter device can be stably placed and safely used without falling down with pressure and weight of the hot water, while the hot water is being poured.

Although the present invention has been described referring to the embodiments, the present invention is characterized in that the container body 1 is composed, in combination, of the open frame 2 and the blind-end frame 3 formed of sheet material such as thick paper or thick non-woven fabric having predetermined rigidity, and the body part 5 formed of sheet material such as thin paper or thin non-woven fabric which is soft and deformable as compared with the open frame and the blind-end frame, having appropriate rigidity, flexibility and a certain shape retaining ability, whereby the open frame 2 and the blind-end frame 3 having the rigidity may have the shape retaining ability for the whole container body 1, while the soft and flexible body part 5 may have deforming ability when folded, thereby to easily perform contracting and expanding operation.

Particularly, the body part 5 provided with the deforming ability is able to freely change in its shape, and adapted to perform the contracting and expanding operation of the container body easily and reliably.

In the aforesaid embodiments, thick paper has been employed as the material for the open frame 2 and the blind-end frame 3, while thin paper has been employed as the material for the body part 5, in consideration of disposal of the filter device after use and easiness in handling the same. However, they can be made of non-woven fabric, for example, provided that the open frame 2 and the blind-end frame 3 have rigidity enough to retain the shape, and the body part 5 is easily deformable while retaining the shape.

In case where the non-woven fabric is employed, thickness of the non-woven fabric may be varied for the open frame 2 and the blind-end frame 3 with respect to the body part 5 so that their rigidity may be different from each other. Specifically, the open frame 2 may have such a thickness as imparting rigidity and strength capable of being gripped with fingers, while the body part 5 may have such a thickness as imparting both flexibility capable of being deformed when the open frame 2 is pushed in, and shape retaining ability enough to maintain the shape when expanded into a tubular shape.

In case of employing paper as the material, it goes without saying that water proofing property is required.

Further, although the container body 1 is in a shape of a circular cup in the described embodiments, it is not limited to the circular shape, but may be in a polygonal shape in application.

The filter device according to the present invention is not limited to the coffee filter device as described in the embodiments, but can be optionally applied to any use depending on the substance 8 contained in the store room 9. Needless to say, it can be also utilized as a tea filter.

Although the present invention has been fully described by way of examples with reference to the accompanying drawings, it is to be noted that various changes and modifications can be made within a scope of the present invention.

What is claimed is:

1. A filter device for coffee or the like comprising:
    an open frame in a short tubular shape;
    a blind-end frame in a short tubular shape having a larger diameter than, said open frame, both said frames being formed of sheet material having predetermined rigidity;
    a body part in a tubular shape of truncated cone formed of sheet material having predetermined rigidity and flexibility which is deformable and has shape retaining ability, said open frame and said blind-end frame being arranged above and below, and integrally connected by way of said body part thereby to compose a container body substantially in a shape of truncated cone in its outer shape; and
    a store room for enclosing substance to be extracted such as ground coffee or the like which is continuously provided in a bottom of said blind-end frame,
    wherein while not in use, said body part is adapted to be invertibly folded and housed inside said blind-end frame together with said open frame by means of flexibility of said body part thereby to contract said container body, and while in use, said body part is expanded by pulling out of said open frame from said blind-end frame, whereby said container body is expanded and restored to an original cup-like shape.

2. The filter device as claimed in claim 1, wherein said container body is formed in a tapered shape having its diameter gradually enlarged from said open frame toward said blind-end frame.

3. The filter device as claimed in claim 1, wherein a height of said open frame is equal to or smaller than a height of said blind-end frame above an upper face of a bottom of said blind-end frame which is adapted to house said open frame.

4. The filter device as claimed in any one of claims 1 to 3, wherein said body part has an upper end edge connected to a lower end of said open frame and a lower end edge connected to an upper end of said blind-end frame, said upper and lower end edges being respectively extended along inner peripheral faces of said open frame and said blind-end frame, and attached so said inner peripheral faces in a face to face contact to be integral therewith.

5. The filter device as claimed in any one of claims 1 to 3, wherein said body part has an upper end edge connected to a lower end of said open frame and a lower end edge connected to an upper end of said blind-end frame, said upper and lower end edges being respectively extended along outer peripheral faces of said open frame and said blind-end frame, and attached to said outer peripheral faces in a face to face contact to be integral therewith, whereby said body part covers whole outer peripheral faces of said open frame and said blind-end frame.

6. The filter device as claimed in any one of claims 1 to 3, wherein said blind-end frame includes a cup holding frame having predetermined rigidity which is formed at a circumferential edge of a bottom of said blind-end frame and extended downwardly from said bottom.

7. The filter device as claimed in claim 6, wherein said blind-end frame is provided with a reinforcing frame which is extended downwardly from said circumferential edge of said bottom and attached to an inner face of said cup holding frame thereby to form a deep engaging space below said bottom.

8. The filter device as claimed in any one of claims 1 to 3, wherein said blind-end frame is provided with a hole in a bottom, through which said store room is hung down, and a skirt extending downwardly along an open edge of said hole and surrounding an outer peripheral face of an upper part of said store room in a face to face contact thereby to hold it water-tightly.

9. The filter device as claimed in any one of claims 1 to 3, wherein said open frame and said blind-end frame are formed of thick paper having predetermined rigidity, and said body part is formed of thin paper having predetermined rigidity and flexibility, which is deformable and has shape retaining ability.

10. The filter device as claimed in any one of claims 1 to 3, wherein said open frame and said blind-end frame are formed of non-woven fabric having predetermined rigidity, and said body part is formed of non-woven fabric having predetermined rigidity and flexibility, which is deformable and has shape retaining ability.

* * * * *